United States Patent [19]

Failliot

[11] 4,101,359

[45] Jul. 18, 1978

[54] COMPOSITE MATERIAL FOR USE IN COVERING WALLS, AND A METHOD OF MANUFACTURING SAME

[75] Inventor: Olivier Failliot, Rochefort en Yvelines, France

[73] Assignee: Compagnie des Etablissements de la Risle-Papeteries de Pont-Audemer, Paris, France

[21] Appl. No.: 723,181

[22] Filed: Sep. 14, 1976

[30] Foreign Application Priority Data

Sep. 24, 1975 [FR] France .............. 75 29222
Jul. 7, 1976 [FR] France .............. 76 20714

[51] Int. Cl.$^2$ .......................................... B32B 29/02
[52] U.S. Cl. ........................ 156/179; 156/220; 156/247; 156/277; 428/110; 428/239; 428/247; 428/255; 428/535
[58] Field of Search ............. 156/220, 179, 181, 247, 156/277; 428/110, 111, 138, 196, 202, 211, 238, 239, 247, 249, 255, 535

[56] References Cited

U.S. PATENT DOCUMENTS

| | | | |
|---|---|---|---|
| 2,064,327 | 12/1936 | Upson | 428/249 |
| 3,085,309 | 4/1963 | Olson | 428/255 |
| 3,130,113 | 4/1964 | Silman | 428/202 |
| 3,597,299 | 8/1971 | Thomas et al. | 156/183 |
| 3,600,262 | 8/1971 | Frank | 428/233 |
| 3,629,047 | 12/1971 | Davison | 428/247 |
| 3,715,264 | 2/1973 | Burton | 428/249 |
| 3,726,750 | 4/1973 | Stillings | 156/179 |
| 3,850,673 | 11/1974 | Nelson | 428/211 |
| 3,862,877 | 1/1975 | Camden | 156/179 |
| 3,881,041 | 4/1975 | Glienke | 428/40 |
| 3,944,692 | 3/1976 | Swenson | 428/40 |

*Primary Examiner*—James J. Bell
*Attorney, Agent, or Firm*—Holman & Stern

[57] ABSTRACT

A highly absorbent and fragile composite sheet normally used as a throwaway domestic wiper is quickly and easily converted to a strong and attractive colored wallcovering. Thus, a composite layer comprising a net material sandwiched between and bonded to a pair of cellulosic-fleece (wadding) layers has a carrier sheet of paper bonded thereto, has colorant applied thereto, and is impregnated with a synthetic resinous bonding medium so that the fleece layers are bonded together at the mesh openings of the net material. In a preferred construction, the carrier sheet of paper has an internal cohesion inferior to that of the composite layer so that with the covering on the wall the composite layer is peelable from the carrier sheet adhering to the wall.

6 Claims, 5 Drawing Figures

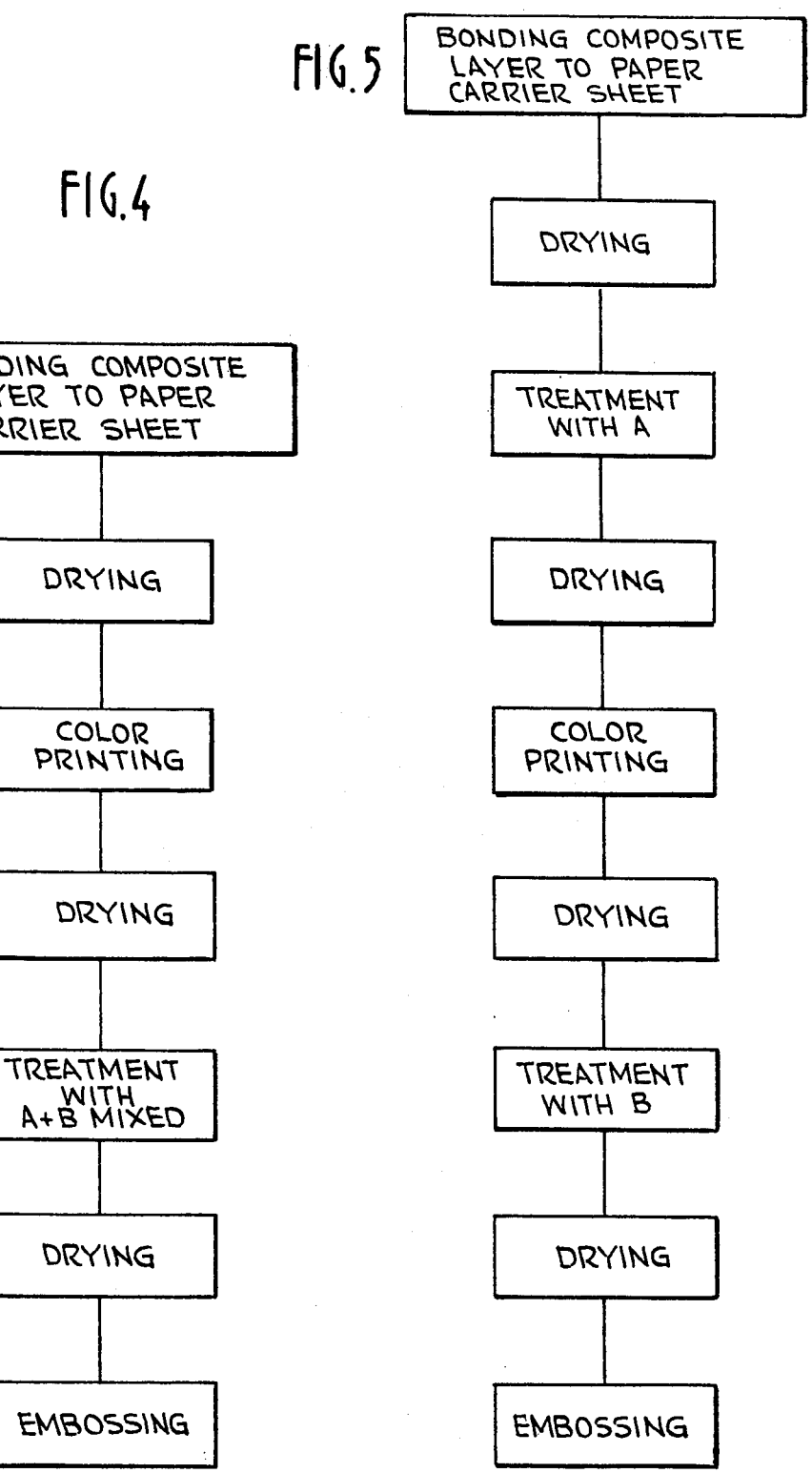

COMPOSITE MATERIAL FOR USE IN COVERING WALLS, AND A METHOD OF MANUFACTURING SAME

The present invention relates to a composite sheet material for use as a wallcovering, and a method of manufacturing same. The invention is particularly but not exclusively concerned with a peelable wallcovering.

One object of the invention is the manufacture of a wallcovering using a composite layer constituted by a net whereof each face is covered by a layer of cellulose fleece (wadding), each said layer being bonded to the net along the threads constituting the net.

Articles are already known which are made up of a textile net, with loose mesh, bonded between two layers of cellulosic fleece. These articles are used particularly in industrial or domestic cleaning. The adhesive bonding together with the layers of cellulosic fleece is distributed only along the threads of the net, so that the main portion of the surfaces of the layers has no adhesive covering, hence the composite sheets extreme flexibility and high absorptive capacity. Given their low cost price, these articles are generally used only once.

As compared with existing wallcoverings having for example a textile or non-woven base material, coverings based on layers of cellulosic fleece bonded to a net material have the advantage of low price. It has also been noted that coverings thus obtained are at least as agreeable in appearance as wallpapers, and give the impression of a woven material, this impression being particularly due to the surface appearance of the cellulosic fleece, and being reinforced by the fact that the net produces a slight relief, the motif of the net itself being selectable as a function of the effect sought after.

However, there is the difficulty that composite layers of the abovementioned type do not have sufficient strength for use per se as a wallcovering, and this strength must not be acquired at the expense of the application of the colour e.g. by printing or dyeing the fleeces.

The chief object of the present invention is to overcome the said difficulty.

According to the present invention we provide a method of manufacturing composite sheet material for use as wall coverings, using a composite layer having a layer of net material disposed between and bonded to a pair of opposed layers of non-woven fibrous material, comprising bonding a carrier sheet of non-woven fibrous material to the composite layer and bonding together the layers of fibrous material at the mesh openings in the net material.

Preferably the layers of fibrous material are cellulosic fleeces (waddings) and the carrier sheet is of paper.

Preferably also a colorant is applied to the composite layer.

The connection between the two layers of cellulosic fleece over their entire surface through the net can only be effected after the colours have been applied, as otherwise the bonding medium which would then impregnate the layers of cellulosic fleece would prevent penetration of the inks.

According to an advantageous embodiment of the invention, the carrier sheet has an internal cohesion inferior to that of the composite layer so that the composite layer is peelable from the carrier sheet. Thus, when it is desired to change the wallcovering, it is sufficient to separate the composite layer of cellulosic fleece from the carrier paper which remains adhering to the wall and constitutes a surface ready to receive another wall covering. In order that the covering according to the present invention be peelable, it is sufficient for the carrier paper to have an internal cohesion inferior to that of the composite layer, so that when they are separated fibres at the surface of the carrier paper in contact with the composite layer are torn off.

According to a preferred embodiment, the wallcovering is given very good properties of resistance to washing. This may be obtained particularly effectively by impregnating the composite cellulosic-fleece layer with a chlorhydrin resin selected from the group consisting of the polyamine/chlorhydrin and polyamide/chlorhydrin resins, and mixtures thereof, and with an aqueous dispersion of a resin, the impregnation also ensuring bonding between the two layers of cellulosic fleece through the mesh openings of the net.

A non-ionic aqueous dispersion is preferably used in order to avoid any interaction with the polyamine/chlorhydrin or polyamide/chlorhydrin resin which is strongly cationic. As suitable aqueous dispersions given by way of example, one may mention dispersions of polyvinyl acetate, copolymeric vinyl acetate and maleic acid ester, acrylic resin and acrylic copolymer.

The aqueous dispersion of synthetic resinous material may comprise a filler, preferably calcium carbonate, in order to avoid any shiny appearance of the wallcovering.

The invention also comprises composite sheet material for use as a wallcovering, whenever obtained by the method according to the invention.

Further according to the present invention we provide composite sheet material for use as a wallcovering comprising a composite layer having a layer of net material disposed between a pair of opposed layers of non-woven fibrous material bonded to the net material and to each other at the mesh openings in the net material, and a carrier sheet of non-woven fibrous material bonded to the composite layer.

Preferably the pair of opposed layers are cellulosic fleeces and the carrier sheet is of paper.

Preferably also the composite layer contains colorant.

The invention will be better understood from the following detailed description and the annexed drawings, which illustrate by way of non-limiting example two embodiments of the invention. In the drawings:

FIG. 4 shows diagrammatically the sequence of operations according to a first embodiment of the invention.

FIG. 5 shows diagrammatically the sequence of operations according to a second embodiment of the invention.

Figure 1:
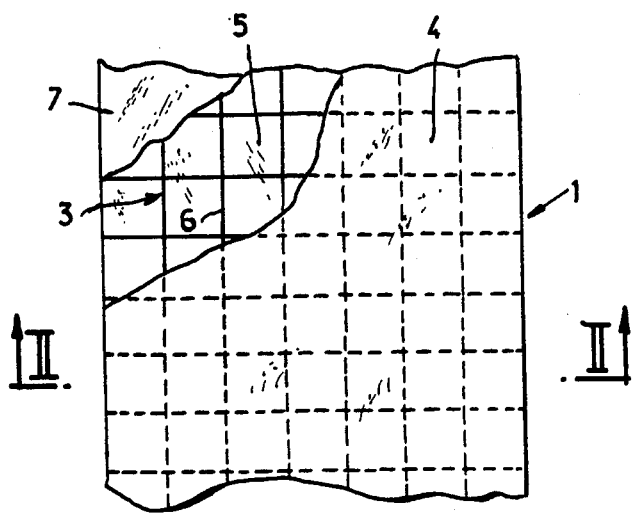
FIG. 1 is a top plan view of a wallcovering with portions removed.

Referring to the drawings:

A wallcovering 1 is manufactured from a composite layer 2 constituted by net material forming a grid 3 whereof the faces are covered by a pair of opposed layers of cellulosic fleece (wadding) 4 and 5 bonded to the grid 3 along the threads 6 constituting the network. The composite layer 2 is bonded to a sheet of carrier paper 7, colours are applied by printing to the composite layer 2 to penetrate the entire thickness thereof and by means of a bonding medium the two layers 4 and 5 of cellulosic fleece or wadding are bonded together over their entire surfaces 4' 5' facing one another through the mesh openings in the grid 3, if necessary by exerting pressure on the whole composite layer.

In order to obtain a peelable wallcovering, it is advantageous in the finished article for the composite layer 2 to have an internal cohesion superior to that of the carrier paper 7. The selection of the carrier paper 7 presents no difficulties, and it will be noted only that the internal cohesion of the composite layer depends particularly on the type of network utilised the dimensions of the mesh and of the threads of the network and also on the treatment which follows coloring. The composite layer 2 is bonded to the carrier paper 7 in a conventional manner. The carrier paper 7 is covered with adhesive by means of coating rollers, the composite layer 2 is applied, and the whole is dried on drying cylinders. For example, there may be utilised as adhesive an acrylic resin with, if necessary, a natural latex. It is important to note that the adhesive must not penetrate too far into the composite layer 2 in order not to hinder unduly the subsequent application of the colours. As adhesive, there may be used, for example, a quantity of synthetic resin of about 10g to about 15g in dry weight per square meter of carrier paper 7.

Figure 2:
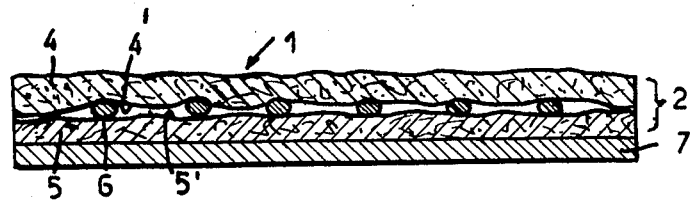
FIGS. 2 and 3 are sections along line II-II of FIG. 1, at different stages of manufacture, the relative dimensions being altered for reasons of clarity.

According to a first embodiment of the invention, corresponding to FIG. 4, the colours are then applied by printing throughout the entire thickness of the composite layer before renewed drying. At this stage, the wallcovering appears as shown in FIG. 2. The surfaces 4', 5' of the layers of cellulosic fleeces are not connected to one another over their entire facing surfaces. FIG. 2 shows the surfaces 4'5' totally separated from one another, by way of illustration only, as these surfaces may naturally be in contact at least at certain points. At this stage the wallpaper has no resistance to humidity or washing, and moreover the internal cohesion of the composite layer 2 is too small to allow separation of this layer from the carrier paper 7; separation would instead be effected between the two cellulosic fleece layers 4 and 5.

Figure 3:
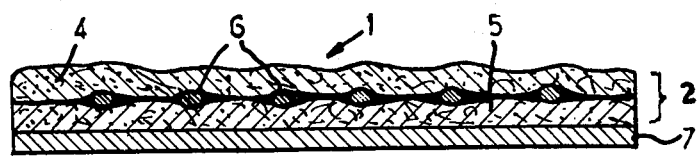

After applying the colors, the two layers of cellulosic fleece 4 and 5 are connected over their entire facing surfaces through the mesh openings of the network. To this effect, the composite layer 2 is impregnated with a mixture of (A) chlorhydrin resin and
(B) resinous dispersion It is possible to add to this mixture a filler consisting of calcium carbonate. Impregnation may be effected between two cylinders, one of which dips into the mixture, and drying follows. At this stage of manufacture, the two layers of cellulosic fleece 4 and 5 are bonded together over their entire surfaces 4'5' through the net openings (FIG. 3).

In order to carry out tests, the chlorhydrin resin used was "Kymene 557" (polyamide/chlorhydrin resin supplied in aqueous solution by the company known as Hercules France), synthetic resinous material was used as a Rhodopas AM (aqueous dispersion of acetate copolymer of maleic vinyl ester, commercially manufactured by the company known as Rhone Poulenc Industries) and as a calcium carbonate filling was used "Omyalite 90" (supplied by the company OMYA). The proportions of the various ingredients, expressed as percentages by weight, are as follows:

Kymene: 20
Rhodopas AM: 33
Omyalite 90: 33
Water: 14

If necessary the stability of the mixture may be improved by adding small quantities of CELON-E (sodium salt of ethylenediaminetetra-acetic acid, provided by Rhone Poulenc) and of tripolyphosphate of soda.

Very good results are obtained by bonding with a polyamide/chlorhydrin resin of 1 to 5% dry weight relative to the weight of the material to be treated, this percentage representing about 10 to 30% of the dry weight of the bonding synthetic resin.

Resistance to washing is controlled by means of a brush to which is imparted a rotary or to-and-fro movement on the surface of the impregnated material which is watered with a conventional domestic detergent solution. By using a device in which the pressure of the brush on the surface may be controlled, the resistance to washing may be determined by the number of movements carried out by the brush before the surface quality begins to change.

Thus, comparative tests were carried out on a sheet of wallcovering according to the invention and on a sheet of wallcovering with a non-woven base of conventional type, the two sheets being subjected to the same treatment for improvement in the resistance to washing, as described above. It was discovered that in both cases 600 brush movements may be carried out before any alteration in surface quality is noted, whereas a wallcovering is considered as washable when it resists 300 brush movements under the same experimental conditions. Consequently the wallcovering according to the invention has a resistance to washing at least equal to that which can be obtained with non-woven material of conventional type.

At the same time as or after the drying operation following the bonding impregnation, embossing may be carried out, which further increases the woven appearance of the covering.

According to another embodiment of the invention (FIG. 5), instead of carrying out the impregnation treatment with a mixture of (A) chlorhydrin resin and (B) synthetic resin in dispersion after color printing, a previous treatment may be carried out with (A) chlorhydrin resin then, after drying, the colors are printed, renewed drying is carried out, and treatment is effected first with (B) the synthetic resin in dispersion including a charge of filler if necessary, and then with a final drying, and if required embossing. In effect the chlorhydrin resin ensures contact of the fibres among themselves and does not interfere with the printing of the colours; on the other hand it does not effect bonding between the two layers of cellulosic fleece.

Naturally, the invention is in no way limited to the embodiments described and shown; it is capable of numerous variants within the ability of the person skilled in the art and depending on the uses envisaged, without, however, exceeding the scope of the invention.

I claim:

1. A method of manufacturing composite sheet material for use as wall coverings, which comprises providing a composite layer constituted by a net material forming a grid each face of which is covered by a layer of cellulosic wadding bonded along the threads forming said grid, bonding a carrier sheet of paper to the composite layer, applying colours in the entire thickness of said composite layer, and then bonding together the layers of cellulosic wadding over their entire surface facing one another through the mesh openings in the grid.

2. The method according to claim 1, wherein after bonding together the layers of cellulosic wadding over their entire surfaces facing one another through the mesh openings in the grid, the composite layer has an internal cohesion superior to that of the carrier sheet of paper, so that said composite layer is peelable from the carrier sheet adhering to a wall.

3. The method according to claim 1, wherein, after the colours have been applied, the layers of cellulosic wadding are impregnated by a mixture comprising:
   a chlorhydrin resin selected from polyamine and polyamide chlorhydrin resins, or mixtures thereof, and
   a non-ionic aqueous dispersion of a resin selected from polyvinyl acetate, a copolymer of vinylacetate and maleic acid ester, acrylic resin, and acrylic copolymer.

4. The method according to claim 3, wherein the mixture for impregnating the layers of cellulosic wadding comprises a mineral filler to avoid shiny appearance of the wall covering.

5. The method according to claim 1, wherein the layers of cellulosic wadding are impregnated with a chlorhydrin resin selected from polyamine and polyamide chlorhydrin resins, or mixtures thereof, the colours are applied to the impregnated layers of cellulosic wadding, and said layers of cellulosic wadding containing the colours are impregnated with an aqueous dispersion of a resin selected from polyvinylacetate, a copolymer of vinylacetate and maleic acid ester, acrylic resin, and acrylic copolymer.

6. The method according to claim 1, further comprising embossing the product of the final bonding step.

* * * * *